United States Patent
Gerharz 3,884,552
May 20, 1975

[54] INVISIBLE TO VISIBLE LIGHT IMAGE CONVERTER

[75] Inventor: Reinhold Gerharz, Bethesda, Md.

[73] Assignee: The United States of America as represented by the Secretary of the Army, Washington, D.C.

[22] Filed: Oct. 5, 1973

[21] Appl. No.: 403,760

[52] U.S. Cl. .............................. 350/161; 250/330
[51] Int. Cl. .............................................. G02f 1/28
[58] Field of Search ............. 250/330, 331; 350/161

[56] References Cited
UNITED STATES PATENTS

| | | |
|---|---|---|
| 3,357,299 | 12/1967 | Noble .............................. 350/161 X |
| 3,397,313 | 8/1968 | Mast .................................. 250/330 |
| 3,603,794 | 9/1971 | Mast .................................. 250/330 |

*Primary Examiner*—Archie R. Borchelt
*Attorney, Agent, or Firm*—Robert P. Gibson; Nathan Edelberg; John E. Holford

[57] ABSTRACT

A simple image converter is provided which includes a hologram developed after a Lippmann type exposure to a visible monochromatic light source, then re-exposed to an invisible light image and a visible light source simultaneously.

7 Claims, 2 Drawing Figures

INVISIBLE TO VISIBLE LIGHT IMAGE CONVERTER

The invention described herein may be manufactured, used, and licensed by or for the Government for governmental purposes without the payment to me of any royalty thereon.

BACKGROUND OF INVENTION

It has long been recognized that detection and surveillance systems designed on optical principles can be greatly enhanced, if their sensitivity is extended beyond the rather narrow band of visible frequencies. The total radiation observed can be more than doubled in such a system. In addition, a totally different contrast can be provided, particularly when the sensitivity is enhanced in the low frequency range. A great deal of information has been obtained on such systems using photographic techniques, but recent efforts have been directed mainly toward real-time systems using semiconductor diodes. Large numbers of diodes are needed to make satisfactory systems, but as yet the cost of these items still restricts the size and resolution of the images obtainable. Even when real-time capabilities are not required the straight photographic technique is hampered by the lack of low frequency response.

SUMMARY OF INVENTION

An object of the present invention is to use photographic techniques in the manufacture of a real-time detector in order to obtain extremely high resolution and high contrast sensitivity. This is achieved by employing holographic techniques and actually using the hologram itself as a sensor.

BRIEF DESCRIPTION OF DRAWINGS

The above and other objects of the invention can be best understood with reference to the accompanying drawings wherein.

Figure 1:
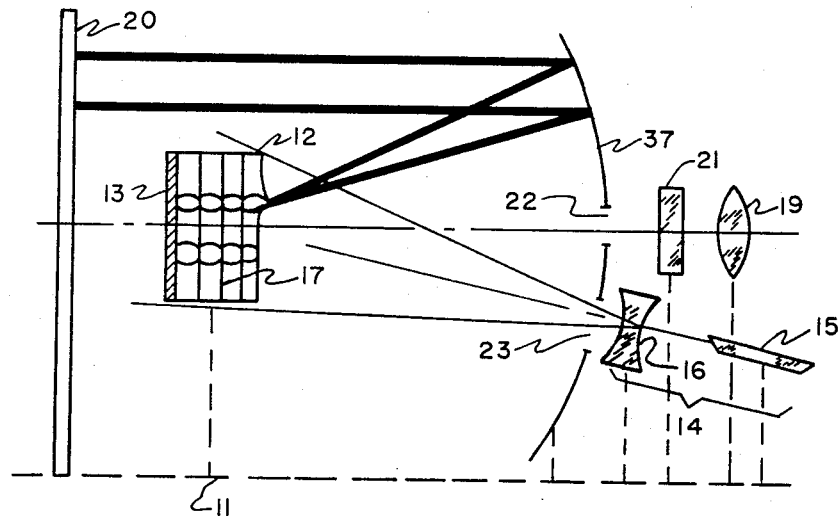
FIG. 1 shows an embodiment wherein a Lippmann type lattice grating is formed in photo-sensitive emulsion, integrated with a mirror surface and employed in a reflective mode as image converter.

Referring specifically to FIG. 1 the detector according to the present invention is mounted on an optical platform 11 indicated schematically by dashed lines interconnecting the various elements. The principal element is a thick layer of photographically active emulsion 12, integrally attached to the reflecting surface of a mirror coating 13 to form a rigid plate. The emulsion layer or plate has dispersed uniformly therein a photographic substance previously exposed to monochromatic light, then developed and fixed, and subsequently illuminated by the visible monochromatic radiation from a point source 14. One such point source is a laser source 15, with a diverging lens 16. When the plate is exposed a resonant effect is observed which is strongly dependent on the temperature of the plate. The frequency or wavelength of the monochromatic source 15 is reflected with minimum regional attenuation at the temperature prevailing during the initial exposure. The absorption of invisible or thermal radiation by the emulsion will cause it to expand.

Thus, the invisible or thermal radiation is intercepted by the Lippmann plate and causes locally detuned regions in the emulsion. These regions follow in shape the thermal image that has been formed by the optical element 37. In FIG. 1 such an element is represented by a large curved reflector surface. The size of the reflector is determined by the weakest image to be detected or any physical constraints imposed on the system such as maximum size or weight. At the same time that the invisible image is present, the plate 12 is preferrably illuminated by the point source 14, this source may be any color or white light, if desired. The visible illumination is viewed or recorded through an optical element 19 near the axis of the reflector 37. A central aperture 22 accomodates to this purpose. The same or a similar off-axis aperture 23 may be used to admit light from the source 14.

The system may also include filters to enhance its performance. The light reaching the reflector may be passed through a filter 20 to remove visible light and any invisible light not desired. In a far infrared detector this can include both the near infrared and ultraviolet. The filter 21, on the other hand, preferably passes only the visible light from the point source 14.

The invention works on the principle that the Lippmann plate will locally deform upon being exposed to the invisible radiation in proportion to the intensity of the radiation. The point source provides a reference beam as used, for example in holography, which traces out an interference pattern produced by the deformation of the lattice 17 in the Lippmann plate. With a monochromatic reference beam, the undistorted plate is bright and the image produces darker contours in the shape of the image. With white light the intensity remains fairly constant but shifts in color from that of the initial monochromatic exposure to produce rainbow-like color contours in the shape of the image.

Figure 2:
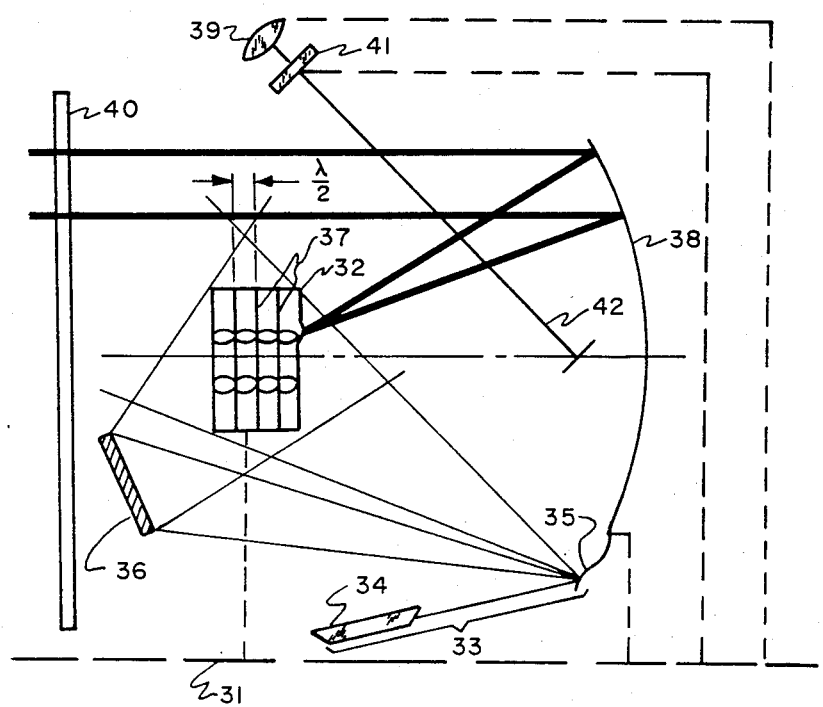
FIG. 2 shows an embodiment wherein said Lippmann plate is employed in a transparent mode being illuminated from two sides by mutually phase coherent beams.

FIG. 2 shows a somewhat different embodiment. An optical platform 31 is again provided. The Lippmann plate 32 in this case does not have a mirror backing. The plate is either made sufficiently thick and rigid to maintain its dimensional integrity through processing and use, or a supporting frame may be provided, if it does not disturb the phase relations of wavefronts entering either broad side of the plate. The point source 33 is shown as a laser 34 and diverging reflector 35, although it is obviously interchangeable with the FIG. 1 arrangement. A redirecting mirror 36 is mounted behind the Lippman plate and intercepts a different solid angle of the radiation from the point source. The radiation intercepted is redirected to the rear surface of plate 32. The two resulting oppositely directed beams create an interference pattern which makes possible the observation of detuned lattice structures 37, similar to those of FIG. 1. A reflector 38 also similar to reflector 18 in FIG. 1 is used to capture the invisible or thermal radiation. Eyepiece 39 and filters 40 and 41 have the same function as elements 19– 21 in FIG. 1, but mirror 42 is added to redirect the visible image away from the mirror axis. This, and the use of diverging mirror 35 in the point source, eliminates the need for apertures in the reflector 38. Here again the arrangements of FIG. 1 and FIG. 2 are obviously interchangeable. Diverging mirror 35 may be formed in the reflector as shown, or be a separate unit. The visual resolution of the system depends on the maximum regional deformation of the plate, which are themselves of the order of wavelengths in the visible spectrum. The thermal coefficient of a typical gelatin emulsion is $2 \times 10^{-3}$ cm/ C. A convenient thickness of the Lippmann filter is 150 wavelengths. The resulting space would have 300 planar lattice elements and should provide high detectability with the holographic method of observation described above.

Many variations of the above structures will obviously occur to those skilled in the art, but the invention is limited only as defined in the claims which follow.

I claim:

1. An invisible to visible light image converter comprising:
   an optical platform;
   a Lippmann type space grating filter plate consisting of a layer of photographic emulsion having a multi-layered lattice type of space grating imbedded therein having first and second broad surfaces and mounted in a first fixed position on said platform;
   a localized source of visible light mounted in a second fixed position on said platform and having a beam angle and direction to fully illuminate said first broad surface of said plate;
   a plane mirror mounted in a third fixed position on said platform with said first position between said second and third, said mirror also being within the beam angle from said source and oriented to fully illuminate said second broad surface; and
   an objective optical means also mounted on said platform to project an invisible image of a distant object on said plate.

2. An image converter according to claim 1 wherein; said plane mirror is attached to said second broad surface of said plate.

3. The image converter according to claim 1 wherein said objective optical means includes:
   filter means for absorbing at least the visible light radiating from said distant object and its surroundings.

4. The image converter according to claim 1 wherein an optical eyepiece means is mounted on said platform to enlarge the visible image formed on said plate.

5. The image converter according to claim 4 wherein: said eyepiece includes a filter means to pass only frequencies generated by said localized source.

6. The image converter according to claim 5 wherein said localized source produces white light.

7. The image converter according to claim 5 wherein said localized source produces substantially monochromatic light.

* * * * *